United States Patent
Gust et al.

(10) Patent No.: US 7,517,584 B2
(45) Date of Patent: Apr. 14, 2009

(54) IN-LINE THERMALLY CURABLE COATING WITH PEROXIDE CURING AGENT

(75) Inventors: Stephen J. Gust, Greenville, SC (US); Jan C. Westermeier, Taylors, SC (US)

(73) Assignee: Mitsubishi Polyester Film, Inc., Greer, SC (US)

( * ) Notice: Subject to any disclaimer, the term of this patent is extended or adjusted under 35 U.S.C. 154(b) by 0 days.

(21) Appl. No.: 11/314,185

(22) Filed: Dec. 21, 2005

(65) Prior Publication Data

US 2006/0147725 A1  Jul. 6, 2006

Related U.S. Application Data

(60) Provisional application No. 60/637,693, filed on Dec. 21, 2004.

(51) Int. Cl.
*B32B 27/26* (2006.01)
(52) U.S. Cl. ................... 428/336; 428/339; 428/220
(58) Field of Classification Search .......... 428/423.1, 428/423.7, 220, 336, 339
See application file for complete search history.

(56) References Cited

U.S. PATENT DOCUMENTS

| 5,679,458 | A | | 10/1997 | Cho et al. |
| 5,698,330 | A | * | 12/1997 | Bederke et al. .......... 427/385.5 |
| 6,228,433 | B1 | * | 5/2001 | Witt ........................ 427/487 |
| 6,395,209 | B2 | * | 5/2002 | Yoshida et al. .......... 264/137 |
| 6,436,540 | B1 | * | 8/2002 | Garcia et al. ............ 428/423.1 |
| 2005/0104214 | A1 | | 5/2005 | Maeda et al. |

OTHER PUBLICATIONS

Search Report for Int'l Appl. No. PCT/US05/46095 dated Apr. 3, 2007.
Abstract of Japanese Patent No. JP2008030, Jan. 11, 1990.
Article—*Crosslinking Technology for Fast-Curing, High-Performance, Low-VOC Coatings*, LuJean Burak, Oct. 1, 2001, 8 pages, www.pcimag.com.
Article—*The Use of Specialty Acrylic Esters In Cure-In-Place Coating Technology*, Bailey et al., Apr. 11, 2000, 10 pages, www.pcimag.com.
Paper entitled *The Effects Polymerization Inhibitors Have on Acrylate Monomers and Formulations* from Sartomer Company, Inc., Jul. 2005, 6 pages.
Product Information for Akzo Nobel Chemicals, Inc. for Thermoset Curing Agents, Apr. 5, 2004, 1 page, www.aksonobel-polymerchemicals.com.
Product Information on Trigonox® 29-B75 from Akzo Nobel Chemicals, Inc., 1999, 2 pages.

* cited by examiner

*Primary Examiner*—Thao T. Tran
(74) *Attorney, Agent, or Firm*—Dority & Manning, P.A.

(57) ABSTRACT

Scratch-resistant thermoplastic films are disclosed. The films include a scratch-resistant coating that is formed from an acrylated binder, a thermal initiator, and a melamine crosslinker. Of particular advantage, the coating can be formed on the film during an in-line process while the film is being formed. The melamine crosslinker not only causes the coating to crosslink but also improves the adhesion of the coating to the film layer. In one embodiment, the film layer is made from a polyester.

18 Claims, No Drawings

IN-LINE THERMALLY CURABLE COATING WITH PEROXIDE CURING AGENT

STATUS OF RELATED APPLICATIONS

The present application is based on and claims priority to the U.S. Provisional Patent Application having Ser. No. 60/637,693, filed on Dec. 21, 2004.

BACKGROUND OF THE INVENTION

The present invention relates generally to a method of coating and curing peroxide-curable coatings in-line on polymer film, and the film produced thereby. More particularly, the present invention is directed to a commercially viable process for producing a coated polymer film having various beneficial properties through in-line coating and peroxide curing steps utilizing a melamine crosslinker.

Polymer film can be modified in various ways to enhance its usefulness for specific applications. Coatings applied to one or both surfaces of the film are commonly used to achieve such modification. Various qualities such as adhesion, smoothness, oxygen permeability, printability, opacity, scratch resistance and the like can be altered through the judicious use of coating technology. Among such coatings, peroxide curable coatings are known. These coatings are typically cured by the in situ polymerization of appropriate monomers and oligomers. Most known curable coatings are applied to film off-line, after the film has been oriented, set and cooled, but the thermal activation and cure required for peroxide curable coatings has generally rendered off-line coating problematic. On the other hand, in-line coating of peroxide curable coatings has generally been considered of limited feasibility.

SUMMARY OF THE INVENTION

Accordingly, it is an object of the present invention to provide for the in-line application of peroxide curable coatings.

It is a further object of the present invention to provide an economical and efficient method for coating film with peroxide curable coatings.

It is a further object of the present invention to provide a durable and scratch-resistant coating suitable for in-line application to the surface of film.

The present invention has accomplished these objectives by providing, in a preferred embodiment, a coating that includes a peroxide cure system in combination with a melamine crosslinker.

For example, in one embodiment, the present disclosure is directed to a scratch-resistant film comprising a film layer and a coating present on at least one side of the film layer. The coating is formed from an acrylated binder, a thermal initiator, and a melamine crosslinker. The acrylated binder, for instance, may comprise an acrylated urethane oligomer, such as a hexofunctional aliphatic urethane acrylate. The thermal initiator, on the other hand, may comprise a peroxide. The peroxide may comprise, for instance, 1,1 di(tertbutylperoxy) 3,3,5 trimethylcyclohexane, t-butyl hydroperoxide, cumene hydroperoxide, isopropyl benzene hydroperoxide, paramethanehydroperoxide, 2,5-dimethylhexane-2,5-dihydroperoxyhexane, 1,1,3,3-tetramethylbutyl hydroperoxide, methylethylketone peroxide, t-butyl perbenzoate, or 1,1-di-(t-butyl peroxy)-3,3,5-trimethylcyclohexane.

Of particular advantage, it has been discovered that the melamine crosslinker not only assists in crosslinking the coating, but also improves the adhesion of the coating to the film. The coating can be formed on the film layer during an in-line process. In one embodiment, no other crosslinkers or adhesion promoters are present in the coating composition except for the melamine crosslinker.

In one embodiment, the coating composition can further contain a monomer diluent, such as a diol acrylate having a functionality of greater than 1. The diol acrylate may comprise, for instance, 1,6 hexanediol diacrylate, trimethylolpropane ethoxy triacrylate, or trimethylolpropane triacrylate. The monomer diluent can be present in an amount up to about 50% by weight of the coating composition.

The formed scratch-resistant coating can have a thickness of from about 1 micron to about 5 microns and can have a Tabor delta haze value of less than about 7, such as from about 5 to about 6. Although the film layer can be made from any suitable thermoplastic polymer, in one embodiment, the film layer is made from polyester.

The present disclosure is also directed to a method for producing a coated film that comprises the steps of forming a film layer comprising a thermoplastic polymer, such as polyester. The above described coating composition is applied to at least one side of the film layer. The film layer is then heated to a temperature sufficient to cause the coating composition to crosslink. For instance, in one embodiment, the coated film can be heated to a temperature of at least about 225° C. As described above, in one embodiment, the coating can be formed during an in-line process.

When producing a polyester film, the polyester can be crystallized as the coating is being crosslinked. Further, the polyester film can be drawn in one or two directions. For instance, in one particular embodiment, the polyester film may be drawn in the machine direction. After being drawn in the machine direction, the coating composition can be applied to the film and the film can be drawn in the cross-machine direction. The above steps can occur on a tenter frame and the heating of the film can occur in a crystallizer. The formed coating can be a free radical type.

DETAILED DESCRIPTION

The present invention encompasses a method of creating peroxide cured coatings in-line, preferably as an integral part of a biaxially oriented film production process. It has traditionally been considered unfeasible to coat and cure peroxide-curable coatings in-line as part of the film manufacturing process. Resulting films are believed to suffer from poor adhesion and scratch-resistance. Nonetheless, it has also been considered unfeasible to form a peroxide-curable coating off-line, because the heat of the thermal cure will typically damage the film at the low coating and curing speeds usable for off-line coating. Consequently, most films of this general type are produced as off-line UV curable coatings, which is a more costly and complex process requiring specialized UV curing equipment and protective gear.

Nonetheless, the present inventors have conducted an investigation into the possibility of such in-line coating and curing. The inventors have discovered that surprisingly, when peroxide curing occurs in the presence of an added melamine crosslinker, a superior film is created having scratch resistance and adhesion equivalent to, or in many cases superior to, that of traditional off-line UV cured coatings. Melamines are known crosslinkers and known to be able, under certain circumstances, to improve adhesion. Nonetheless, a range of alternate known crosslinkers showed no such ability to enhance the adhesion and scratch-resistance of in-line peroxide cured coatings. Consequently, it was unexpected and surprising to identify that the melamine crosslinker provided a viable coating, let alone the superior properties attributable to the use of the melamine cross-linker. This allows films to be formed that have the properties of many known off-line cured films. However, this method eliminates the costly, labor-intensive off-line coating step.

Peroxide free-radical cure systems vary in their composition. Preferred peroxide cure systems are known in the art and are commercially available. One preferred hardcoat system includes a urethane acrylate oligomeric binder, with a diol acrylate as a monomer diluent and a peroxide initiator, which readily generates radicals when heated.

Acrylated urethane oligomers typically have four basic building blocks—a diisocyanate, a polyol segment, a urethane linkage and an organic capping group. More preferably, the urethane acrylate binder is a hexafunctional aliphatic urethane acrylate containing an acrylated polyol diluent (PETA). The foregoing urethane acrylate is available from UCB Surface Technologies/Radcure under the tradename Ebecryl 8301. Other useful urethane acrylates include Ebecryl 1290 and others.

Diluents are optional, but preferred for use in compositions according to the present invention. Monomer diluents are typically 100% solids, enabling a reduced volatile organic compound involvement. Monomers are typically acrylates or methacrylates of low viscosity that act as reactive diluents, as crosslinkers, and/or to enhance performance or other properties of the resulting polymer. The diol acrylate is preferably 1,6 hexanediol diacrylate (HDODA), commercially available from UCB Surface Technologies/Radcure. Other similar acrylate diluents useful in the coatings of the present invention include trimethylolpropane ethoxy triacrylate (TMPOETA), discussed below, and trimethylolpropane triacrylate (TMPTA). Viscosities of about 5 to about 25,000 are typical. Preferred functionality is greater than one. Monomers are preferably alkoxylated, in part because they are less skin sensitizing.

Temperature sensitive initiators such as peroxides are preferred for use herein. Azonitrile compounds may also be used, alone or in combination with the peroxides. The peroxide thermal initiator is preferably 1,1 di(tertbutylperoxy) 3,3,5 trimethylcyclohexane, in one preferred embodiment carried 75% in plasticizer, and available from Akzo Nobel as Trigonox 29B. Trigonox C and Trigonox 122-C80 are other preferred alternatives. Faster peroxides may also be used in the present invention to limit the cure time necessary in the crystallizer zone and thus optimize the speed of film manufacture.

The peroxide curing agents to be used may include t-butyl hydroperoxide, cumene hydroperoxide, isopropyl benzene hydroperoxide, para-methanehydroperoxide, 2,5-dimethylhexane-2,5-dihydroperoxyhexane, 1,1,3,3-tetramethylbutyl hydroperoxide, methylethylketone peroxide, t-butyl perbenzoate, 1,1-di-(t-butylperoxy)-3,3,5-trimethylcyclohexane and similar components. Ketone peroxides, diacyl peroxides, dialkyl peroxides, peroxy ketals, alkyl peresters, peroxy carbonates and water soluble peroxides may also be used, alone or in combination with other peroxide curing agents.

The preferred melamine cross-linkers of the present invention are (methoxymethyl)melamine-formaldehyde resins, including but not limited to the preferred hexamethoxymethylmelamine available as Cymel 303. It is believed that other epoxies will have the surprising effects of the melamines. Cymel 303 is known to have a theoretical molecular weight of 390 grams per mole and an effective equivalency of 2.2 which leads to an effective equivalent weight of 177.3 grams per equivalent.

Optional ingredients include trimethylolpropane ethoxy triacrylate (TMPEOTA) as a monomer diluent and acrylated silicone available from UCB Surface Technologies/Radcure as Ebecryl 350, for wetting and slip. Polymeric or inorganic particles may be added, among other things as handling aids or to matte the film. Other adhesion promoters may also be used in combination with the melamine cross-linker. A polymerization inhibitor may also be used, typically in combination with and as a moderator for the polymerization initiator. The inhibitor preferably minimizes any premature polymerization caused by free radical generators present in the monomers or oligomers (e.g., increasing shelf life). Other initiators may be used in combination with the peroxide cure initiator.

Application of heat is necessary for a thermal cure system. The heat of the crystallizer zone of the typical biaxial film orientation process is sufficient to obtain a successful cure of the peroxide based coatings. For example, temperatures of about 225 to about 240 degrees Celsius can be used. The resulting haze of the coated and cured film is a significant property for many end uses. Tabor delta haze values of about 0 to about 7 are preferred, with values of about 5 to about 6 being alternately preferred. The method used to determine the adhesiveness and stability of the resulting coating is a crosshatched tape test. Preferred scratch-resistance is measured by the Tabor abrasion test (CS-10F calibration wheels, 2×50 cycles reface between samples, 70% vacuum, 500 grams, 100 cycles).

Process changes/optimization desirable for the present invention include elimination/minimization of oxygen at the surface of the film. This facilitates the most complete cure. Various methods are available. Mechanical methods such as flooding the atmosphere with inert gases such as nitrogen are preferred. Chemical means may also be used. Metal driers and monomers that act as efficient oxygen scavengers (e.g., allylic functional monomers) can also be introduced to achieve oxygen elimination/minimization.

The melamine crosslinker is preferably present at about 0.001% to about 10% by weight of the composition, alternately about 0.01% to about 5%, alternately about 0.1% to about 3%. It is preferred that the peroxide thermal initiator is present at about 0.01 to about 10% by weight of the coating composition, alternately about 0.1 to about 2.0% by weight, alternately about 0.5% to about 1.0% by weight. The binder is preferably present at about 50% to about 90% by weight of the coating composition, alternately about 60% to about 85%, alternately about 70% to about 80%. The monomer diluent is preferably present at about 10% to about 40%, alternately about 20% to about 30%, alternately about 22% to about 27% by weight of the coating composition.

One preferred application of the present invention is for use in forming scratch-resistant lamination films. Other optimal end uses include membrane touch panels, plasma, and LED display screens, dry erase surfaces, back-printed advertising media and anti-reflective base film.

Off-line coatings (including peroxide curable coatings) are typically applied thickly to achieve reasonable scratch-resistance. The in-line coated peroxide curable coatings of the present invention have been found to provide excellent scratch-resistance at equivalent coating thicknesses. Prior to full orientation, but more preferably following the machine direction stretching of a film, a peroxide curable coating is applied that is thick enough to fill minor imperfections created during prior processing (typically referred to as scuffs and scratches). The coating is preferably molten in both the preheating and stretching processes. It is then cured to form a layer on the surface of the film that is smooth and essentially free from physical imperfections. The final hardened coating optimally will be of similar refractive index as the film substrate so that the film surface imperfections are completely hidden. The coating can contain fillers or itself have properties to enhance handling, post-processing scratch resistance or other attributes. This development permits the production of unfilled and/or ultra-clear products using standardized processing equipment. It also permits the formation of clear films without the use of coextrusion equipment.

Peroxide curable coatings of the present invention can be used to provide a variety of attributes to the base film. For example, the peroxide curable coatings can be used to form hard coats, having clear, satin and/or matte finishes, coatings with affinity to pressure sensitive adhesive, silicone release films and ink jet coatings.

While very thin coatings of less than 0.2 microns, or less than 0.1 microns can be achieved by the present method, thicker coatings are also possible where additional properties are achieved with such increased thickness. For example, a coating thickness of about 3 microns seems to be required for adequate scratch resistance using preferred coating compositions. Preferred thickness of about 1 to about 5, alternately about 2 to about 4 microns, are used. However, for certain end uses, hard coats requiring tightly bound chemistry can be achieved through a thicker application in-line of the peroxide curable coatings of the present invention. These thicker coatings enable the formation of a tightly cross-linked system that is crucial to formation of a hard coat film. The resulting film has optimal haze and scratch-resistance properties.

Polymer Film

For the preferred films and methods of the present invention, a polymer film substrate is most useful. It provides a lightweight, substantially transparent, inexpensive, inert, disposable or recyclable substrate that accommodates many of the end uses of safety films. In addition, the coated polymer film can also easily be laminated by heat bonding or by adhesives to various other substrates, including glass or polymeric plates marketed as glass substitutes.

The films and methods of the present invention can employ any polymeric film capable of biaxial orientation. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or dial with a dicarboxylic acid (or its ester equivalents) such as terephthalic acid, isophthalic acid, sebacic acid, malonic, adipic, azelaic, glutaric, suberic, succinic acids and the like, or mixtures of two or more of the foregoing, are preferred for use in the present invention. Suitable glycols include ethylene glycol, diethylene glycol, polyethylene glycol, and polyols such as propanediol, butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art. Conventional coatings can be used with the films of the present invention, whether under, over, or on the opposite face of the peroxide curable coatings of the present invention. Combinations of the foregoing can also be employed. For example, coatings containing pigments or dyes, other colorants, stabilizers, antistatic agents, adhesion promoters and the like can be coated onto the films of the present invention. Alternatively, these additives can be incorporated into the peroxide curable coatings of the present invention.

In addition, for certain end uses, the base polymer film may be a coextruded polyester composite. Any of the various methods for film coextrusion of orientable polymers may be employed to produce the coextruded base films.

The films may be produced and oriented by any of the many known techniques in the art. For example, polyester is typically melted and extruded as an amorphous sheet onto a polished revolving casting drum to form a cast sheet of the polymer. The sheet is quickly cooled and then stretch oriented in one and then the other direction to impart strength and toughness to the film. The sheet is typically stretched from about two to about four times the original cast sheet dimension, in one or both directions. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C., with adjustments as described above to optimize the peroxide cure process.

The films and methods of forming such films of the present invention are not limited to use as described in the preferred embodiments. The films may be employed in the production of laminates. Alternate composites in which films of the present invention may be desirable include composites with such materials as metals, polymeric articles and the like. Furthermore, it is envisioned that polymer films of the present invention can also be applied to other surfaces, including irregular surfaces, to provide unique attributes to those surfaces. The film may be heat bonded, coextruded with or adhered to the surface, or can be mechanically attached via fasteners, clips and the like.

While surface modification of the base polymer film is not required, such modification can be used with the base polymer films according to the present invention. Conventional surface modification techniques include corona treatment, which is the most common and most preferred procedure for modifying the surface of the polymer base film. Corona treatment can be used to enhance adhesion and reduce blocking of unfilled film during winding, among other things. Corona treatment of about 1.0 watt per square foot per minute is typically sufficient to achieve the desired results.

EXAMPLE SERIES 1

The following coatings were formulated and applied to biaxially oriented polyethylene terephthalate base film according to the present invention. A standard method for making three mil unfilled polyester film was used. After the machine direction drawing step, the film was coated using a Meyer rod and heated to around 110 degrees Celsius and drawn about 4 times in the transverse direction before curing at about 235 degrees Celsius for about 15 seconds. In addition to the components noted in the chart, all coatings included Ebecryl 8301 at 75% and monomer diluent HDODA at 25%, percentages in weight percent of base to which additional components were added. Coatings were made as follows:

HDODA was added to the Ebecryl 8301 while stirring. Peroxide 29B75 was then added to the mixture while continuing to stir. Stirring was done with a blade stirrer for about 20 minutes to insure good dispersion of the peroxide. Finally, the Cymel 303 was added and stirred for about 10 more minutes. Additional ingredients were mixed for about 10 minutes. All mixing was done at around 23 degrees Celsius. The final, dried coating thickness achieved was about 2.5 to 3.5 microns. Adhesion and scratch resistance were measured according to the following methods: Steel wool scratch resistance was measured by rubbing a circular pattern 10 times with 0000 steel wool and subjectively grading the amount of scratching with 0 being no scratching and 5 being substantial scratching. Adhesion was measured by lightly cross hatching the coating and then using Scotch 610 tape to try and pull away the coating. A rating of 0 indicated nothing being pulled away, with higher numbers indicating greater coating release.

| Sample | Peroxide P29B75 | Silane Z6040 | Adhesion Promoter HF86 | Melamine Resin Cymel 303 | Adhesion Promoter PC850 | Adhesion 0 = best 5 = worst | Steel Wool Scratch 0 = best 5 = worse |
|---|---|---|---|---|---|---|---|
| C1 | 1 | 0 | 0 | 1 | 1 | 0 | 4.5 |
| C2 | 2 | 0 | 0 | 0 | 0 | 5 | 1.5 |
| C3 | 1 | 1 | 0 | 0 | 1 | 0 | 5 |
| 4 | 2 | 1 | 0 | 1 | 0 | 0 | 0 |
| C5 | 1.5 | 0.5 | 0.5 | 0.5 | 0.5 | 0 | 4 |
| C6 | 1 | 0 | 1 | 1 | 0 | 0 | 4 |
| C7 | 2 | 0 | 1 | 0 | 1 | 3.5 | 3.5 |
| C8 | 1 | 1 | 1 | 0 | 0 | 0 | 5 |
| C9 | 2 | 1 | 1 | 1 | 1 | 0 | 3.5 |

PC850 (Silcoease PC-850) adhesion promoter is a substituted organosilane available from Rhodia. HF86 adhesion promoter is a silane ester mixture made by Wacker Silicones, Adrian, Michigan.

Only Example 4, which includes the Cymel melamine crosslinker but does not include other adhesion promoters, provides optimal results on both adhesion and scratch resistance tests. The addition of other crosslinking agents appears to impair scratch resistance. The use of Cymel alone provides excellent adhesion and scratch resistance

EXAMPLE SERIES 2

Coatings containing Ebecryl 8301 and monomer diluent as set forth in Example Series 1 but formulated with varying levels of melamine resin were applied to biaxially oriented polyester film as above.

| Sample | Peroxide P29B75 | Melamine Resin Cymel 303 | Adhesion 0 = best 5 = worst | Steel Wool 0 = best 5 = worse | Tabor Abrasion Delta Haze % |
|---|---|---|---|---|---|
| C1 | 1 | 0 | 5 | 2 | 8.8 |
| 2 | 1 | 0.5 | 0 | 2 | 6.0 |
| 3 | 1 | 0.75 | 0 | 0.5 | 5.8 |
| 4 | 1 | 1 | 0 | 1 | 6.1 |
| C5 | 2 | 0 | 5 | 1 | 5.7 |
| 6 | 2 | 0.5 | 1 | 2 | 6.0 |
| 7 | 2 | 0.75 | 1 | 0.5 | 5.6 |
| 8 | 2 | 1 | 0 | 0.5 | 5.5 |

Coatings without Cymel performed poorly in adhesion testing. Other films performed well, showing that Cymel provides key adhesion properties. In addition, varying amounts of peroxide and Cymel (and their relative weight percent ratios) affects adhesion and tabor abrasion results. Ratios of about 1:1 to about 4:1 are preferred (peroxide to Cymel) with ratios of about 1:1 to about 2:1 being more preferred.

The present invention having been thus described with particular reference to the preferred forms and embodiments thereof, it will be obvious to one of ordinary skill in the art that various changes and modifications may be made therein without departing from the spirit and scope of the invention as defined in the appended claims.

What is claimed:

1. A scratch-resistant film comprising:
   a film layer; and
   a coating on at least one side of the film, the coating comprising an acrylated binder, a thermal initiator, and a melamine crosslinker,
   wherein, the film layer has been stretched in at least one direction and said coating has a thickness of about 1 micron to about 5 microns.

2. A scratch-resistant film as defined in claim 1, wherein the acrylated binder comprises an acrylated urethane oligomer.

3. A scratch-resistant film as defined in claim 1, wherein the coating further contains a monomer diluent.

4. A scratch-resistant film as defined in claim 3, wherein the monomer diluent comprises a diol acrylate.

5. A scratch-resistant film as defined in claim 3, wherein the monomer diluent comprises 1,6 hexanediol diacrylate, trimethylolpropane ethoxy triacrylate, or trimethylolpropane triacrylate.

6. A scratch-resistant film as defined in claim 3, wherein the monomer diluent has a functionality greater than 1.

7. A scratch-resistant film as defined in claim 1, wherein the thermal initiator comprises a peroxide initiator.

8. A scratch-resistant film as defined in claim 7, wherein the peroxide initiator comprises 1,1di(tertbutylperoxy)3,3,5trimethylcyclohexane.

9. A scratch-resistant film as defined in claim 7, wherein the peroxide initiator comprises t-butyl hydroperoxide, cumene hydroperoxide, isopropyl benzene hydroperoxide, paramethanehydroperoxide, 2,5-dimethylhexane-2,5-dihydroperoxyhexane, 1,1,3,3-tetramethylbutyl hydroperoxide, methylethylketone peroxide, t-butyl perbenzoate, or 1,1-di-(t-butylperoxy)-3,3,5-trimethylcyclohexane.

10. A scratch-resistant film as defined in claim 2, wherein the acrylated urethane oligomer comprises a hexafunctional aliphatic urethane acrylate.

11. A scratch-resistant film as defined in claim 1, wherein the coating has a Tabor delta haze value of less than about 7.

12. A scratch-resistant film as defined in claim 1, wherein the coating has a Tabor delta haze value of from about 5 to about 6.

13. A scratch-resistant film as defined in claim 1, wherein the film layer comprises a polyester film.

14. A scratch-resistant film as defined in claim 1, wherein the thermal initiator is present in relation to the melamine crosslinker in a weight ratio of from about 1:1 to about 4:1.

15. A scratch-resistant film as defined in claim 3, wherein the acrylated binder comprises an acrylated urethane oligomer, the acrylated binder being present in the coating in an amount from about 50% to about 90% by weight, the thermal initiator comprising a peroxide initiator and being present in the coating in an amount from about 0.01% to about 10% by weight, the melamine crosslinker being present in the coating in an amount from about 0.001% to about 10% by weight, and the diluent being present in the coating in an amount from about 10% to about 50% by weight.

16. A scratch-resistant film as defined in claim 3, wherein the acrylated binder comprises an acrylated urethane oligomer, the acrylated binder being present in the coating in an amount from about 60% to about 85% by weight, the thermal initiator comprising a peroxide initiator and being present in the coating in an amount from about 0.1% to about 2% by weight, the melamine crosslinker being present in the coating in an amount from about 0.1% to about 5% by weight, and the diluent being present in the coating in an amount from about 20% to about 30% by weight.

17. A scratch-resistant film as defined in claim 1, wherein the coating contains no other crosslinkers or adhesion promoters except for the melamine crosslinker.

18. A scratch-resistant film as defined in claim 1, wherein the film layer has been biaxially stretched.

* * * * *